(12) United States Patent
Aretz et al.

(10) Patent No.: US 6,684,079 B1
(45) Date of Patent: Jan. 27, 2004

(54) METHOD FOR DISTURBANCE-FREE OPERATION OF AT LEAST TWO BASE STATIONS IN A UNIVERSAL MOBILE TELECOMMUNICATIONS SYSTEM

(75) Inventors: Kurt Aretz, Isselburg (DE); Edgar Bolinth, Mönchengladbach (DE); Erich Kamperschroer, Hamminkeln (DE); Uwe Schwark, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,185

(22) PCT Filed: Sep. 29, 1999

(86) PCT No.: PCT/DE99/03138
§ 371 (c)(1),
(2), (4) Date: Mar. 28, 2001

(87) PCT Pub. No.: WO00/19631
PCT Pub. Date: Apr. 6, 2000

(30) Foreign Application Priority Data

Sep. 24, 1998 (DE) .......................... 198 43 969

(51) Int. Cl.$^7$ .............................................. H04B 15/00
(52) U.S. Cl. .................... 455/502; 455/448; 370/509; 370/335
(58) Field of Search .............................. 455/447, 448, 455/449, 426.1, 462, 465, 502; 370/509, 335, 342, 503, 324

(56) References Cited

U.S. PATENT DOCUMENTS 5,784,368 A * 7/1998 Weigand et al. ............ 370/350
5,864,549 A    1/1999 Honkasalo et al.
6,101,176 A * 8/2000 Honkasalo et al. ......... 370/335

FOREIGN PATENT DOCUMENTS

| EP | 0 865 172 A2 | 9/1998 |
| WO | WO 97/24820 | 7/1997 |
| WO | WO 98/39939 | 9/1998 |

OTHER PUBLICATIONS

A Joint Detection CDMA mobile radio system concept developed within COST 231—Jung et al., pp. 469–473.

* cited by examiner

Primary Examiner—Nay Maung
Assistant Examiner—Nick Corsaro
(74) Attorney, Agent, or Firm—Bell, Boyd & Lloyd LLC

(57) ABSTRACT

A method for disturbance-free operation of at least two base stations working according to the CDMA (Code Division Multiple Access) principle in a universal mobile telecommunications system, preferably in-house base stations, with partially overlapping radio fields relative to one another and/or with respect to a telecommunications radio cell network, wherein the base stations transmit the communications information using the CDMA multiple access method, at least two participating stations carry out an autosynchronization procedure for the purpose of eliminating disturbing interferences on account of the overlapping radio fields and identical transmission frequency, chip synchronism being produced as a result and, consequently, good reception of the orthogonal codes, i.e. good subscriber separation of the multiple access method, is ensured.

9 Claims, 2 Drawing Sheets

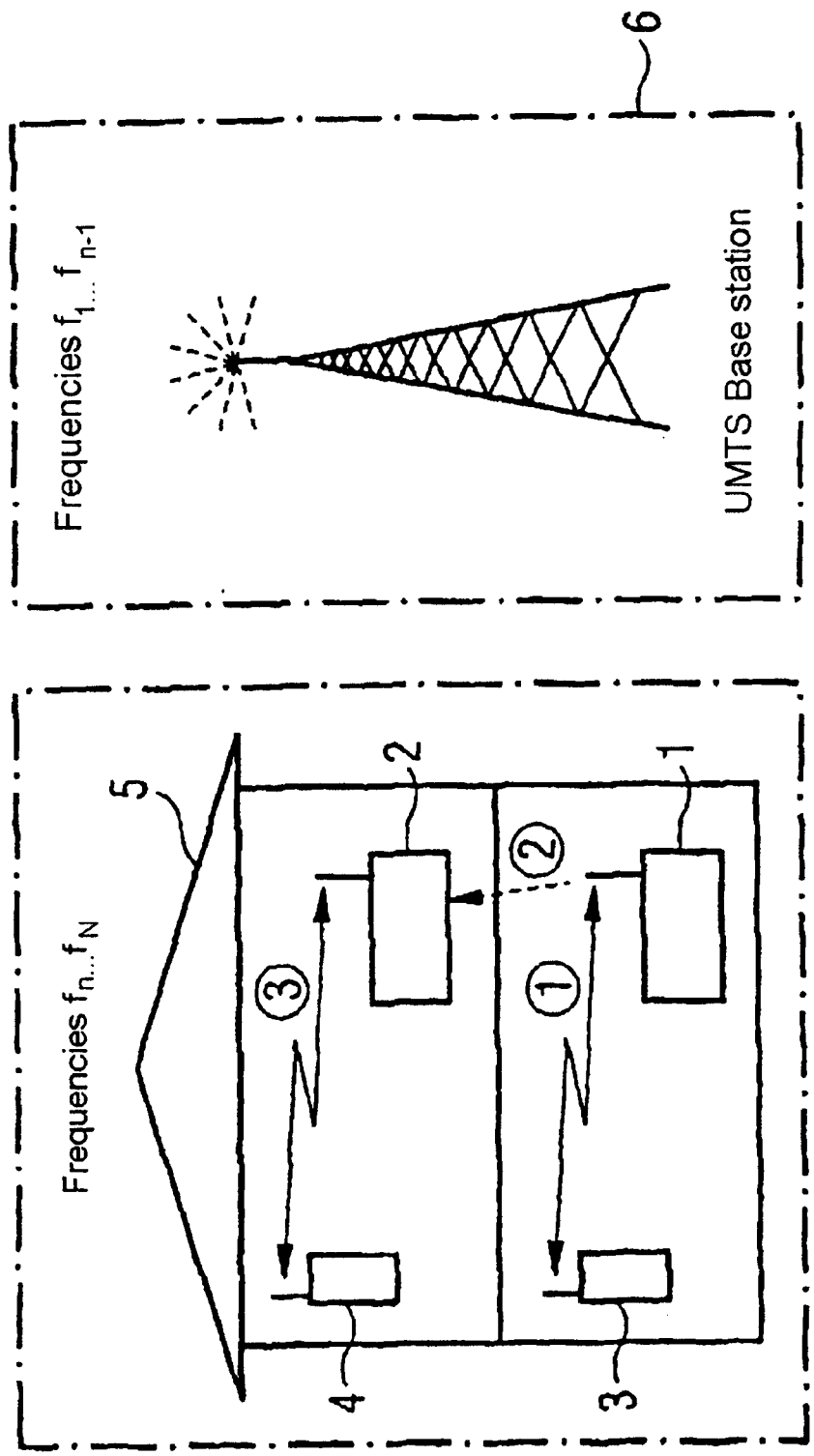

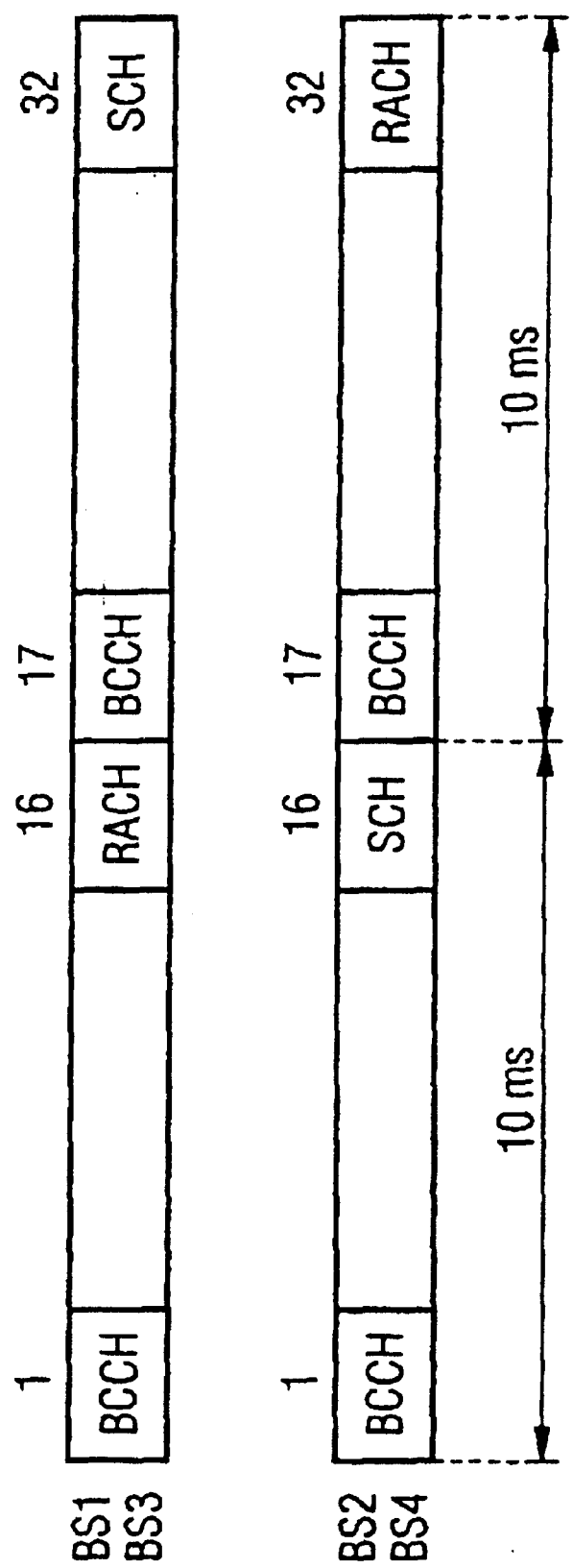

METHOD FOR DISTURBANCE-FREE OPERATION OF AT LEAST TWO BASE STATIONS IN A UNIVERSAL MOBILE TELECOMMUNICATIONS SYSTEM

The present invention relates to a method for disturbance-free operation of at least two, preferably in-house UMTS (Universal Mobile Telecommunication System), base stations with partially overlapping radio fields in a telecommunications radio cell network, the base stations transmitting communications information using the CDMA (Code Division Multiple Access) multiple access method, and also to a base station and to a mobile station for disturbance-free operation in a universal mobile telecommunications system.

DESCRIPTION OF THE PRIOR ART

It is known, in wire-free communications systems, to utilize physical channels for the transmission of messages or data. By the utilization of such physical channels, the communications information, for example in the form of real time video voice data or recently real time data, is communicated via an air interface from a first station to a second station. In the case of duplex radio connections, information is also exchanged in the opposite direction via the same air interface.

Parameters of the physical channels are, for example, a specific time slot in a TDMA (Time Division Multiple Access) radio communications system, a specific carrier frequency utilized during the communication of the communications information in an FDMA (Frequency Division Multiple Access) radio communications system, and a specific code used to code the communications information for radio transmission in a CDMA (Code Division Multiple Access) radio communications system. Combinations of the known multiple access methods TDMA, FDMA and CDMA are also possible.

In a known mobile radio system, in particular the so-called GSM system (Global System for Mobile Telecommunication), the allocation of the radio channels via which communications information can be transmitted between a specific base station and a specific mobile part is performed centrally by a coordination unit. The coordination unit assigns a specific number of radio channels to the individual control units of the GSM base stations taking account of specific country conditions (e.g., the interference situation calculated a priori).

Furthermore, radio communications systems exist which work in so-called uncoordinated operation. In systems of this type, the radio channels are not allocated centrally for the entire system, rather the radio stations participating in a radio connection that is to be set up select for themselves the relevant channels from an existing channel supply according to specific criteria. One example of a radio station which works in the uncoordinated operation mentioned above is that which operates according to the DECT standard.

Thus, in known radio communications systems, in particular in a GSM, a system according to the DECT standard or in the future UMTS, duplex radio connections are set up in order to bidirectionally transmit data even at relatively high data rates, voice information or, generally, communications information of other services via a radio interface. Known methods include here, in particular, the so-called TDD (Time Division Duplex) method, in which a first radio channel and a second radio channel of the same duplex radio connection utilize different time slots of the same carrier frequency.

The third-generation mobile radio system UMTS is intended to cover both the conventional so-called outdoor range and in-house range. For the optimal functioning of a mobile radio system of this type, the envisaged resource planning is inherently provided, and explicit frequency planning is not necessary. While a handover to the adjacent base station is made under severe interference conditions (adjacent base station is a source of interference) in the outdoor range, this cannot happen with in-house base stations. Therefore, in this case an effective method of interference elimination (synchronization→midamble→interferences) is crucial for a high spectral efficiency of the system. In the case of a mobile radio system which covers both the quasi-public and the private sectors, the difficulty that arises for the operator is that home base stations installed in the private sector are not under the control of the operator and, therefore, cannot be controlled from the network.

In the case where, on account of such home base stations becoming increasingly widespread, such home base stations are located in direct proximity, which is the case for example in a multiple dwelling, the radio fields of the individual home base stations can then overlap, with the consequence of reciprocal interference and of limited or interference-impaired radio transmission.

In the DECT structure, that channel which allows an undisturbed connection set-up for data transmission is selected in a quasi self-organizing manner by the subscribers of the respective local network before the connection set-up. In the case where interference occurs, a channel changeover is made to a channel which is once again free from interference or freer from interference, such changeover generally being imperceptible to the user. Since the radio communication is realized under TDMA in the case of the DECT system, a channel changeover is not very problematic even in the absence of synchronization between the subscribers; i.e., in the event of a changeover to another base station.

Difficulties arise, however, when the CDMA multiple access method is intended to be used for a universal mobile radio system. In that case, the chip synchronism, i.e. the use of mutually orthogonal CDMA codes, is a prerequisite for preventing interference caused by the users or in order to obtain optimal spectral network efficiency. If a number of base stations are operated asynchronously in such a system, severe interference and, under certain circumstances, considerable losses of capacity shall be registered on account of the lack of orthogonality of the CDMA codes; particularly when, even in the in-house range, high-bit-rate data services are intended to be handled or taken up via the system.

Ep 0 865 172 A2 discloses a method for operating at least two overlaid wire-free communications systems, the two communications systems being at least one indoor and one outdoor communications system and, for interference-free operation of the two systems, existing radio connections in the in-house range being handled via time slots in accordance with a time division duplex method and, at the same time, these time slots being utilized in order to monitor radio channels utilized for existing radio connections in the outdoor range, with the result that rapid reaction to changing traffic requirements or reaction to interferences is possible.

It is an object of the present invention, therefore, to specify a method for disturbance-free operation of at least two in-house UMTS base stations with partially overlapping in-house radio fields in a telecommunications radio cell network, the assumption being that the base stations transmit communications information according to the CDMA principle; i.e., multiple access method. The present invention is intended to increase the spectral efficiency through optimal utilization of the network conditions, without the need for reserving a broad frequency spectrum specifically for the in-house application. At the same time, the present invention is intended to improve the signal or data transmission quality, so that even in a region of high local density of the base stations, there is sufficient channel capacity available for data transmission.

SUMMARY OF THE INVENTION

Accordingly, the method-pertaining basic concept of the present invention consists in the fact that the at least two participating base stations which have partially overlapping radio fields perform an autosynchronization procedure for the purpose of eliminating disturbing interferences precisely on account of the overlapping radio fields and the fact that it is no longer possible to fall back to two frequencies. Chip synchronism is achieved as the result of this autosynchronization procedure, and it is thus assured that orthogonality of the codes of the multiple access method of the participating, adjacent base stations is produced.

In a preferred embodiment of the present invention, a reserved in-house frequency range in the UMTS system is assumed, in which case, during the transmission of a base station in such a reserved in-house frequency range, the additional further base station firstly checks whether the desired, selected frequency is free or busy. In the case where the additional base station selects a busy frequency, a fallback is effected to a free frequency in the reserved frequency range or frequency band.

When simultaneous operation of a multiplicity of base stations is present, so that complete capacity utilization of the reserved frequency range occurs or such a consequence arises with the added base station, the respective additional station selects a minimally interfering frequency or a frequency having the smallest interference component and detects the base station accordingly. Afterward, chip synchronism with respect to this detected base station or with respect to the nearest base station is produced in accordance with the CDMA stipulations.

The autosynchronization procedure proposed according to the present invention differs from standardized synchronization procedures for coordinated operation, which are controlled centrally, by virtue of a decentralized mode of operation.

In other words, an initiation and control of the synchronization procedure is performed by each base station within its own cell. This synchronization is preferably suitable for uncoordinated multicell systems and produces the required synchronism of the participating base stations.

According to the present invention, for the autosynchronization procedure, a reserved synchronization channel SCH with synchronization signal is provided in the transmission frames transmitted by the base stations, the signal, upon reception by the added or additional base stations, enabling the production of chip synchronism between the participating stations. When chip synchronism is produced, the added base station is able to receive the synchronization signal in a reserved random access channel RACH.

The reserved SCH is regularly a downlink channel and the reserved RACH an uplink channel, which are alternately transmitted at a periodic interval.

In the case where further additional base stations are to be synchronized, synchronization is effected with the synchronization channel having the highest received field strength or transmission power in accordance with a time slot pattern.

According to the present invention, the base stations may have an internal random number generator which initiates, for the respective base station, a function exchange or allocation exchange of the time slots for the synchronization channel and the random access channel, as a result of which renewed synchronization is possible even in the event of failure of the synchronization reference station.

Finally, it is possible for each base station to transmit on the synchronization channel or on another channel information about the CDMA codes already used in the cell. This information can be received by the rest of the participating base stations, but it also can be recieved by the mobile stations, and be utilized in connection with a channel estimation—carried out using a midamble for the purpose of minimizing or eliminating the intracell and the intercell interferences, the result being improved spectral efficiency.

After the conclusion of the synchronization procedure between the base stations, in a manner known per se, a synchronization with respect to the mobile part is performed, so that after the secondary synchronization has been effected, the connection set-up for the purpose of transmitting and exchanging messages can be effected.

A further aspect of the method of the present invention consists in the fact that user or base station detection is possible by each base station transmitting a specific midamble. A channel estimation is possible using the transmitted midamble, the channel estimation estimating the transmission channels between the mobile station and up to 8 in-house base stations. This channel transfer function is then used for determining and eliminating the interference signals (interference elimination). In this case, the time-slot and chip synchronism is an essential prerequisite for a usable channel estimation result. In principle, the spectral efficiency in the respective local radio cell can thereby be improved.

The base station proposed according to the present invention for disturbance-free operation in a universal mobile telecommunications system has a receiving device for detecting further active systems in the relevant in-house frequency range. A channel or frequency selection assembly that is provided makes it possible to change or to select a channel or a given frequency in the reserved frequency range. The synchronization procedures are handled via a synchronization assembly which can take the form of hardware and/or software. Specifically, the synchronization assembly enables the selection of time slots assuring freedom from interference or of codes during the communication of messages toward the mobile part.

In an embodiment an interference analysis unit is implemented in the respective base stations in order, when the allocation of all available reserved frequencies or channels has been ascertained, to select a frequency or a base station with minimal disturbance or interference, in order then to produce the required time-slot or code synchronism therewith for traffic handling purposes.

Via the method according to the present invention and the associated base station, the possibility can be created, through the principle of time-slot synchronization, wherein a number of home base stations are allowed to transmit at the same frequency, but in different time slots, without reciprocal interference occurring. The chip-exact synchronization of the stations that is achieved furthermore enables a higher spectral efficiency in such a way that a number of mobile parts which are respectively assigned to different base stations can work without interference at the same frequency in the same time slot, the CDMA components being optimally utilized in this case. It is thus possible to open up, in the in-house range, applications with high-rate data transmission quantities, without having to use the public network. In terms of present method, then, synchronization of home base stations is achieved locally, i.e. outside the sphere of influence of a centrally controlled resource planning, wherein good reception of the orthogonal codes is ensured.

Additional features and advantages of the present invention are described in, and will be apparent from, the following Detailed Description of the Preferred Embodiments and the Drawings.

DESCRIPTION OF THE DRAWINGS

FIG. 1 shows a possible scenario in which two in-house or home base stations potentially interfere with one another due to the given reception conditions within a building, with and consequence of corresponding interferences; and FIG. 2 illustrates frame structures of the participating base stations.

DETAILED DESCRIPTION OF THE PREFERRED EMBODIMENTS

In principle, it is assumed that a separate frequency band with correspondingly reserved frequencies ($f_n \ldots f_N$) is made available for UMTS applications in the local area. The then quasi-superordinate cellular UMTS mobile radio applications are handled in the frequency range $f_1 \ldots f_{n-1}$.

Taking the reserved frequency range as a departure point, in the case of the two base stations 1 and 2 which are situated in a building 5 and are shown by way of example, a check is now made prior to the connection set-up, utilizing a selected frequency, to determine whether possibly this frequency is not already busy. For this purpose, the base stations 1 and 2 have corresponding receiving devices for detecting further active systems and also a channel or frequency selection assembly which can be used to change or select a channel or a frequency.

If the base station to be activated ascertains that the selected frequency is already busy, a fallback is made to a frequency that is still free in the range ($f_n \ldots f_N$), or to a corresponding other channel.

In the case where the adjacent base stations are active on all frequencies available in the range $f_n \ldots f_N$, i.e. there is no free frequency available, the additional base station checks the instantaneous interference characteristics and determines that frequency at which only minimal or the least interference is received. The corresponding detection of these frequencies and, thus, of the base station communicating there is followed by the initiation of synchronization with the aim of chip synchronism.

FIG. 2 illustrates frame structures of the participating base stations for the autosynchronization. The designations chosen in FIG. 2 for the base stations BS1, BS2 et cetera at the same time serve for illustrating the order of the autosynchronization procedures to be carried out.

The starting point is formed by the operational base station BS1, completely allocated adjacent frequencies being presupposed here.

The base station BS2 would now like to be synchronized with the base station BS1 and receives the frame structure as illustrated. In this case, the base station BS2 seeks a special signal for the synchronization channel SCH, which can be used to produce chip synchronism with the base station BS1. The base station BS2 is now likewise able to receive the synchronization channel SCH of the base station BS1 on a so-called random access channel RACH.

The RA channel may be the same channel used by a mobile station in order to request at the base station the set-up of a telephone connection. The channels RACH and SCH are, in this case, special reserved channels, SCH being a downlink channel and RACH being an uplink channel, which are transmitted alternately at a specific periodic interval.

In the example shown, the period is equal to 2, RACH and SCH being transmitted once every two frames, by way of example. In this case, a frame corresponds to 16 time slots.

If a further base station, for example the base station BS3 is added, then the latter seeks the synchronization channel or channels SCH having the highest transmission power and is synchronized with this time slot pattern in a chip-synchronous manner, as shown in FIG. 2. Then, with the transmission power of the base stations BS1 to BS3 being received at the same level, an additional base station BS4 would be synchronized with the base stations BS1 and BS3, etc.

In the case where the transmission power of the base station BS2 exceeds the sum of all other synchronization channels (base station BS1 and base station BS3) and the base station BS4 is newly added, the base station BS4 would be synchronized with the base station BS2. In the case of a functional failure of the base station BS2, e.g. as a result of network interruption, the remaining base stations BS1, BS3 and BS4 would no longer receive a reference synchronization signal; namely, synchronization channel from BS2. Therefore, appropriate precautions must be taken for stable operation in such a scenario. For this purpose, an instant in which the function of the time slots of the synchronization channel and random access channel are interchanged is communicated to each individual base station via an internal random number generator. Assuming that the base station BS1 would be the first to interchange the position of RACH (at present slot 16) and SCH (at present slot 32) in the time slots, the result of this is that RACH (afterward slot 32) and SCH (afterward slot 16) are transmitted, so that the base stations BS3 and BS4 can again receive a reference synchronization signal, as a result of which the system is stable.

Furthermore, each base station can transmit, on the synchronization channel or a further channel information about CDMA codes already used in the respective cell. This information can be received by the other base stations, but also may be recieved by the mobile stations, and be utilized in connection with the channel estimation carried out using the midamble for the purpose of reducing or eliminating the intracell and intercell interferences, thereby establishing an improvement in the spectral efficiency. With regard to FIG. 2, it also shall be noted that BCCH denotes the broadcast control channel. After autosynchronization has been effected, i.e. on achieving the use of orthogonal CDMA codes of the participating stations, in a manner known per se, the synchronization with respect to the corresponding mobile part is performed and the connection set-up is effected.

The handling procedure described enables chip-synchronous operation of adjacent base stations and of corresponding mobile parts, correct orthogonality of the CDMA codes precluding reciprocal interference and enabling optimal utilization of the frequency spectrum.

In the case of UMTS devices utilizing an air interface with a TD-CDMA (Time Division—Code Division Multiple Access) standard, the time slot synchronization can be used to achieve the situation where a number of participating base stations transmit at the same frequency in different time slots, without reciprocal interference occurring. Furthermore, it is possible for a number of mobile parts assigned to different base stations to be active without interference at the same frequency in the same time slot, with the result that the CDMA-inherent advantages and components can be optimally utilized.

In accordance with FIG. 2, the method sequence is realized by the hardware components, taking account of the reserved frequencies $f_n \ldots f_N$ which lie outside the frequency range $f_1 \ldots f_{n-1}$ of the UMTS base station 6, as follows.

In a first step, a synchronization known per se and a call set-up between the first mobile part 3 and the first base station 1 are effected. If the second base station 2 is to be activated and both stations 1 and 2 transmit at the same frequency and no further free frequencies are available, synchronization of the base station 2 with the base station 1 is performed. In a next step, the second mobile part 4 is synchronized with the second base station 2. After the selection of an as yet unallocated channel in accordance with the CDMA code or of a corresponding time slot, the call set-up between the mobile part 4 and the base station 2 can then be initiated, without interference occurring despite identical transmitting and receiving frequencies of the participating base stations 1 and 2.

Attention shall be drawn to the fact that just two base stations and two mobile parts have been illustrated in the drawing merely for reasons of simple illustration. It goes without saying that in the context of the available codes and taking account of the spreading factor and also in accordance with the frequency range $f_n \ldots f_N$, a significantly larger number of base stations can be operated without interference in direct proximity, without departing from the principle described by the present invention.

Indeed, although the present invention has been described with reference to specific embodiments, those of skill in the art will recognize that changes may be made thereto without departing from the spirit and scope of the invention as set forth in the hereafter appended claims.

What is claimed is:

1. A method for disturbance-free operation of at least two base stations working according to a Code Division Multiple Access (CDMA) principle in a universal mobile telecommunications system, each of the at least two base stations having a radio field which overlaps with at least one of the radio field of the other base station and a telecommunications radio cell network, the method comprising the steps of:

performing an autosynchronization procedure to eliminate disturbing interferences based on overlapping radio fields and identical transmission frequencies, wherein a reserved synchronization channel with a synchronization signal is provided in transmission frames transmitted by each respective base station;

producing chip synchronization between the base stations and orthogonality of the codes of the multiple access method upon reception of the respective synchronization signal by the respective base station; and receiving the respective synchronization signal in a reserved random access channel of the respective base station if chip synchronization is produced.

2. A method for disturbance-free operation of at least two base stations in a universal mobile telecommunications system as claimed in claim 1, wherein, during transmission by one of the base stations in a defined, reserved in-house frequency range, the other base station first checks whether the desired frequency is available and, if the desired frequency is unavailable, the other base station falls back to a frequency in the reserved frequency range.

3. A method for disturbance-free operation of at least two base stations in a universal mobile telecommunications system as claimed in claim 2, wherein, during simultaneous operation of a plurality of base stations in a frequency range utilized to capacity, the receiving base station selects a minimally interfering frequency and produces chip synchronization with respect to at least one of an interference-causing base station and a nearest base station.

4. A method for disturbance-free operation of at least two base stations in a universal mobile telecommunications system as claimed in claim 1, the method further comprising the step of:

performing a secondary synchronization, after a conclusion of the autosynchronization procedure, with respect to a respective mobile station and a connection set up for transmission and exchange of messages.

5. A method for disturbance-free operation of at least two base stations in a universal mobile telecommunications system as claimed in claim 4, the method further comprising the steps of:

performing a channel estimation between the mobile station and the base stations using a transmitted midamble; and using a channel transfer function resulting from the channel estimation for determining and eliminating interference signals.

6. A method for disturbance-free operation of at least two base stations in a universal mobile telecommunications system as claimed in claim 1, wherein the reserved synchronization channel is a downlink channel and the reserved random access channel is an uplink channel, the two channels being alternately transmitted at a periodic interval.

7. A method for disturbance-free operation of at least two base stations in a universal mobile telecommunications system as claimed in claim 1, wherein further base stations are synchronized in a timing-pattern-conforming manner, and synchronization channels of the further base stations have a highest received field strength.

8. A method for disturbance-free operation of at least two base stations in a universal mobile telecommunications system as claimed in claim 1, wherein each respective base station has an internal random number generator which initiates, for the respective base station, one of a function exchange and an allocation exchange of the time slots for the synchronization channel and the random access channel, allowing for renewed synchronization even if the synchronization reference station fails.

9. A method for disturbance-free operation of at least two base stations in a universal mobile telecommunications system as claimed in claim 1, wherein, in a predetermined channel, the base stations transmit information about CDMA codes already used, the information to be used by the participating mobile station and base stations for minimizing the interferences.

* * * * *